United States Patent Office 3,428,595
Patented Feb. 18, 1969

3,428,595
METHOD OF PREPARING ANTISTATIC MOLDED ARTICLES OF SYNTHETIC RESIN
Tomomichi Tsukada, Kawasaki-shi, Kimiaki Kabuki, Tokyo, and Tokuo Nakazawa, Kawasaki-shi, Japan, assignors to Tokyo Shibaura Electric Co., Ltd., Kawasaki-shi, Japan, a corporation of Japan
No Drawing. Filed Apr. 1, 1966, Ser. No. 539,285
Claims priority, application Japan, Apr. 7, 1965, 40/20,014, Patent 41-3209
U.S. Cl. 260—41 2 Claims
Int. Cl. C08f 45/04; C08c 11/10

ABSTRACT OF THE DISCLOSURE

This disclosure relates to the manufacture of molded synthetic resin articles wherein a zeolitic substance or the combination of a zeolitic substance and colloidal silica or colloidal alumina are added to the synthetic resin to reduce semipermanent electrostatic charging of the final molded product.

---

This invention relates to the manufacture of molded articles in which an antistatic agent to prevent electrostatic charging is added, and relates more particularly to a method of preparing such articles characterized by semipermanent static charge prevention.

Generally, synthetic resins have a characteristic of good electrical insulation, so that electrification tends to be generated in their surface due to frictions or impingements during their handling. Due to this electrification, the phenomenon of dust adsorption or electric shock tends to be caused, thus inviting various inconveniences and dangers during the molding process of the resins or during the handling of processed articles, or damaging the appearance of the articles.

In order to eliminate these defects, it is generally practiced to mix a small amount of various antistatic agents, such as, for example as, quaternary ammonium salts, into a resinous material thereby to inductively eliminate electrostatic charge to be stored in the surface of the molded resin article.

However, a method of preventing static charge is still not at all satisfactory, due to the reason that the articles molded from synthetic resins and mixedly added with an antistatic agent may fully attain the effect of preventing electrification only at an earlier stage, but it is observed that their abilities of static charge prevention are extremely lowered as they are repeatedly subjected to washing or rubbing treatments. In order to avoid this extreme lowering of the effect of static charge prevention due to washing or friction, the amount of the antistatic agent employed may be increased to attain its purpose to some extent. On the other hand, however, an increase in the amount of antistatic agent may necessarily lower such various physical properties of a molded article particularly as bending strength, tensile strength, shock resistance, thermal deforming temperature and so on. Also, an increase in the amount of the insoluble antistatic agent in the synthetic resin tends to damage the external appearance of the article, thus causing a problem in utilization.

An object of this invention is to provide a method of preparing molded articles of synthetic resin having an excellent characteristic of charge prevention without damaging its physical properties or appearance.

Another object of this invention is to provide a method of preparing molded articles of synthetic resin having a characteristic of semipermanent charge prevention which is not damaged by washing, wiping or rubbing.

Still another object of this invention is to provide a method of preparing molded articles of synthetic resin by a prior art process of adding an antistatic agent into synthetic resinous material and a simple process further added to said prior art process, whereby the foregoing objects may be attained easily and yet economically.

These objects may be attained by mixing into the resinous material a small amount of a zeolitic compound serving as a promoter or an antistatic improver together with the antistatic agent generally employed in the art, and molding such resinous material.

The features of the invention which are believed to be novel are set forth with particularity in the appended claims. The invention itself, however, as to its organization together with further objects and advantages thereof, may best be understood by reference to the following description.

The feature of this invention is as follows. Namely, a usually well known antistatic agent and a zeolitic compound serving as its promotor are homogeneously mixed in a synthetic resin with or without the addition of a well known stabilizer, plasticizer, coloring matter, lubricant and/or a filler, and the mixed compounds are molded by heating. The composition of the zeolitic compound may be represented by the general formula,

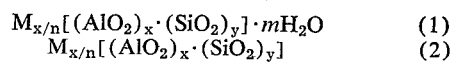

$$M_{x/n}[(AlO_2)_x \cdot (SiO_2)_y] \cdot mH_2O \quad (1)$$
$$M_{x/n}[(AlO_2)_x \cdot (SiO_2)_y] \quad (2)$$

where

M is an element of Na, K or Ca;
$n$ is the atomic valence of M;
$x, y$ are optional positive integral numbers, respectively; and
$m$ is the number of crystal water molecules.

Among the antistatic agents known in the art, various cationic, anionic or nonionic surfactants may be used in this invention. The antistatic agent may take either a liquid or a powder form.

The most typical and effective promotor among those used with the above mentioned antistatic agent according to the method of this invention is the synthetic zeolite represented by the Formula 1. Microporous channels are formed in the crystalline construction of the synthetic zeolite of the Formula 1 by the separation, by heating, of crystal water therefrom, thus resulting in the so-called molecular sieves shown by the Formula 2. Various grades of this synthetic zeolite or molecular sieve are manufactured and sold by Union Carbide and Chemical Corporation, U.S.A. The synthetic zeolite has a net-work constitution of microporous channels having a molecular dimension of diameter between 4 A. and 15 A., and has a strong sorption power. This net-work constitution has an activity particularly to adsorb a hydroxyl group, so that the zeolite is capable of absorbing or adsorbing a large amount of water due to its activity at the net-work constitution or pores. (Absorption and adsorption are summarily called "sorption.")

The reason that the synthetic zeolite is used as a molecular sieve is that the diameter of the micropore thereof is constant according to the grade of the zeolite, and there are several grades having a molecular dimension ranging from 4 A. to 15 A. as stated above, so that it is possible to separate the gas from the gaseous mixture by adsorbing such substance that has a molecular diameter smaller than the micropore of the zeolite selected to have a proper dimension. For example, an A-grade synthetic zeolite of micropores having a diameter of 6 A. may adsorb aromatic compounds of small molecular weight as well as quaternary isoparaffin, but a B-grade synthetic zeolite having micropores of a diameter of 5 A. does adsorb normal paraffin but not isoparaffin or aromatic compounds. Further, a C-grade synthetic zeolite having a pore diameter of 4 A. adsorbs methane or ethane, but does not adsorb normal paraffin above $C_3$. While a D-grade synthetic zeolite of a pore diameter of 3.8 A. adsorbs $H_2$ (diameter of the molecule: 2.4 A.), $O_2$ (diameter of the molecule: 2.8 A.) and $N_2$ (diameter of the molecule: 3.0 A.), but not methane or ethane.

It has been well known to prevent electrostatic charge on the surface of molded articles of synthetic resin by adding to the synthetic resin 0.1 to 4.0% by weight of the above mentioned antistatic agent, based on the total weight of the said resin. It has also been known that the effect of the antistatic agent becomes extremely decreased as the washing or rubbing of the surface of the article is repeated. As a result of research for preventing this effect from being decreased, it has been found that the prevention of charge can be semipermanently continued without degrading the various physical properties of the synthetic resin by simultaneously adding to the synthetic resinous material, with the antistatic agent, a fine powder of synthetic; zeolite, as a promotor, in the amount equal to that of the antistatic agent, viz, 0.1 to 4.0%, by weight, based on the total weight of the synthetic resin material. Since the amount of the promotor to be incorporated is very small, the appearance of the molded articles may not be affected thereby.

Although the above described synthetic zeolite is most effective as the promotor to be added, natural minerals of zeolite group may also be used. Among the natural minerals of zeolite group are, for example, Chabasite (main component—$CaAl_2Si_4O_{12} \cdot 6H_2O$ or $$Na_2Al_2Si_4O_{12} \cdot 6H_2O)$$

Analcite (namely $NaAlSi_2O_6 \cdot H_2O$), Mordenite (namely $CaAl_2Si_{10}O_{24} \cdot 6H_2O$, $Na_2Al_2Si_{10}O_{24} \cdot 6H_2O$ or $$K_2Al_2Si_{10}O_{24} \cdot 6H_2O)$$

Faujasite (namely, $Na_2Al_2Si_5O_{14} \cdot 10H_2O$ or $$CaAl_2Si_5O_{14} \cdot 10H_2O)$$

and the like. The dehydration, by heating, of these minerals will cause microporous channel of molecular dimensions as in the case of the synthetic zeolite. The natural minerals of zeolite group are very brittle and readily formed into fine particles in a 200 to 300 mesh. The natural minerals of zeolite group have an effect of charge prevention somewhat inferior to the synthetic zeolite, but are characterized by the fact that the cost thereof is extremely low when compared with that of the synthetic zeolite. It should be understood that a mixture of the synthetic and natural zeolites may, of course, be used.

The operation of these promotors to be used with the antistatic agents in accordance with the method of this invention are not yet completely apparent. It is supposed, however, that the antistatic agent generally has in its molecule a side branch of such as hydroxyl group, methyl group or ethyl group, so that the existence of the antistatic agent in the resinous molded article is stabilized owing to the fact that the legs of the side branch may be thrust into the micropores of zeolite. In a molded article wherein only the antistatic agent is used without a promotor, the charge preventing effect on the surface of the article is extremely lowered by repeated washing or wiping operations and will not be recovered even if time passes. While in a synthetic resin in which a zeolitic compound is incorporated as a promotor with the antistatic agent in accordance with this invention, even if washing or wiping is repeated, and even if a small amount of electrification is caused immediately thereafter, the resin is recovered from charging within a short period of time and the lowering of the effect of static charge prevention does not occur. Thus, it has been confirmed through experiments that this effect is maintained semipermanently.

Almost all of the synthetic resins may be named as those usable in the method of this invention for the purpose of performing the function of static charge prevention. They are, for example, polyvinyl chloride, copolymers of vinyl chloride and vinyl acetate, polystyrene, methylmethacrylate, polyethylene, polypropylene, polycarbonate, copolymers of acrylonitrile and styrene, copolymers of acrylonitrile, butadiene and styrene, epoxy resin, polyester, diallylphthalate resin and so on.

Where colloidal silica or colliodal alumina usually known as adsorbent is used as a promotor instead of the zeolitic compound, it does not show such a great effect as may be performed by zeolite. But experiments have shown that the function of the promotor can be improved when zeolite and colloidal silica or colloidal alumina are used together in the amount equal to that of the zeolite compound.

As has been described, according to the method of this invention, it is possible to economically produce a synthetic resinous molded article having a semipermanent static charge preventing ability without damaging the physical properties or external appearance inherent to the synthetic resin, by a simple operation of adding to a conventional antistatic agent a small amount of zeolitic compounds, which are almost equal in amount to that of the antistatic agent.

The invention is more clearly set forth in the following examples, all parts and percentages being by weight.

Example 1

One hundred parts of impact resisting polystyrene resin powder, stearamidopropyldimethyl - $\beta$ - hydroxyethylammonium nitrate of such parts as respectively indicated in Table I, serving as an antistatic agent of a cationic surfactant type, and synthetic zeolite (Molecular Sieves 13X, the trade name used by Union Carbide and Chemical Corporation, U.S.A.) of parts respectively indicated also in Table I, serving as a promotor, were homogeneously mixed, heated and kneaded by an extruder to prepare six types of pellets A to F as shown in Table I. D, E and F designate pellets prepared by a method other than that of this invention, wherein D indicates those containing no antistatic agent and no promotor, E shows those containing only an antistatic agent and F shows those wherein only a promotor was incorporated.

TABLE I.—COMPOSITION

|  | A | B | C | D | E | F |
|---|---|---|---|---|---|---|
| Antistatic agent | 2.0 | 2.0 | 3.0 | 0 | 2.0 | 0 |
| Promotor | 2.0 | 1.0 | 1.0 | 0 | 0 | 2.0 |

These pellets were respectively subjected to injection molding at a temperature of 200° C. to obtain disc plates each having a diameter of 90 mm. and a thickness of 2 mm. Each of the plates thus molded had substantially a colorless external appearance and showed no degradation, by heating, of the physical strength thereof. Electrostatic potential caused on the surface of each of the molded plates immediately after rubbing it twenty times by a gauze applied with a load of 1 kg. was measured at a temperature of 22° C. and a relative humidity of 60%. Thereafter the electrostatic potential was similarly again measured after sufficiently washing the surface of each of the rubbed plates with water and successively subjecting it to a similar rubbing operation. A spectrometer was used for this measurement. The Izod impact strength and the tensile strength of the molded bodies were also measured. The results of measurement were as shown in Table II below.

TABLE II.—RESULTS OF MEASUREMENT

|  | A | B | C | D | E | F |
|---|---|---|---|---|---|---|
| Electrostatic potential before washing (v.) | 0 | 0 | 0 | 3,600 | 30 | 3,300 |
| Electrostatic potential after washing (v.) | 0 | 0 | 0 | 3,600 | 2,400 | 3,300 |
| Izod impact strength (notch type) (Kg.-cm./cm.) | 3.6 | | | | 3.2 | 3.2 | 3.0 |
| Tensile strength (kg./cm.²) | 240 | | | | 240 | 240 | 220 |

As will be apparent when comparing D and F in Table II, a resin to which synthetic zeolite alone is added performs substantially no effect of static charge prevention.

Example 2

Two parts of stearamidoethyldimethyl-β-hydroxyethylammonium chloride which acted as the antistatic agent of a cationic surfactant type, 2 parts of synthetic zeolite (Molecular Sieves 5A, the trade name adopted by Union Carbide and Chemical Corporation, U.S.A.) serving as a promotor and 2 parts of a stabilizer of dibutyltin-dilaurate were homogeneously mixed with 100 parts of a copolymer of vinyl chloride and vinyl acetate (the content of vinyl acetate was 16%, and the degree of polymerization was 450). The mixture was sufficiently kneaded by means of a heating roll maintained at a temperature of 150° C. to prepare a resin composite.

The resin composite was press-molded at a temperature of 150° C. and under a pressure of 50 kg./cm.$^2$ to obtain square plates each having a thickness of 3 mm. and a side length of 200 mm. The molded plates were substantially colorless, and no degradation of quality of heating was noted.

The electrostatic potential on the surface of the molded resin plate, which was measured at a temperature of 23° C. and at a relative humidity of 55% promptly after rubbing the resin plate by means of a gauze applied with a load of 1 kg. for 20 times was zero volts. The surface potential measured after sufficiently cleaning the molded plate by a synthetic detergent, adequately washing it with water, leaving it for 24 hours at room temperature and rubbing it in a similar manner as above, appeared to be −100 v.

For the purpose of comparison, the similar tests were performed on a molded body which had been subjected to a static charge preventing process by using the similar procedure as above only with the exception that no synthetic zeolite was added. The results showed that the electrostatic potential was −10 v. in case no washing treatment with water was made, and −2500 v. when said treatment was made, respectively. The recovery of the static charge prevention ability due to the progress of time was not noted.

Example 3

To 100 parts of polypropylene, the melt index thereof being 1.3, were homogeneously mixed 2 parts of a triethanolamine salt of dilauryl phosphate, which served as an anionic surfactant type antistatic agent, and 1.5 parts of synthetic zeolite (Molecular Sieves 4A, the trade name adopted by Union Carbide and Chemical Corporation, U.S.A.) as a promotor. The mixture was kneaded under heating by an extruder to prepare pellets. The pellets were molded by the injection method at a temperature of 210° C. to obtain molded discs of a diameter of 90 mm. and a thickness of 2 mm. According to a rubbing test carried out using the similar procedure as in the previous example, the resulting electrostatic potential was zero volts, both before and after the washing treatment.

For the purpose of comparison, similar tests were carried out on a molded body subjected to a static charge preventing process in the manner similar to that stated above only with the exception that no synthetic zeolite was added. The results showed that the electrostatic potential of the molded body was 5 v. in the case where no washing treatment with water was made, and 3300 v. when said treatment was made, respectively.

The static charge preventing ability was slightly observed to be gradually recovered. But the electrostatic potential of the body measured after being left for 10 days was still 1500 v.

Example 4

To 100 parts of polypropylene, the melt index thereof being 4, were homogeneously added 0.1 part of an antistatic agent of N-lauryldiethanolamine (cationic surfactant type) and 0.1 part of a promotor of synthetic zeolite (Molecular Sieves 13X) for the purpose of preparing pellets.

The pellets were molded by the injection method at a temperature of 240° C. and under a pressure of 50 kg./cm.$^2$, with the result that disc plates having a diameter of 90 mm. and thickness of 2 mm. were obtained. The similar tests as in Example 1 were made two days after the molding operation and the electrostatic surface potential was measured to be almost zero volts. 24 hours after the washing treatment the electrostatic surface potential was 30 v. For the purpose of comparison, the similar tests as above which were carried out with the above mentioned composition with the addition of 0.1 part or 0.3 part of the antistatic agent and without the addition of the promotor resulted as follows:

| | Electrostatic potential after 2 days from molding, v. | Electrostatic potential after 24 hours from washing, v. |
|---|---|---|
| Antistatic agent: | | |
| 0.1 part | 850 | 3,500 |
| 0.3 part | 90 | 2,500 |

Example 5

To 100 parts of the powder of acrylonitrile-butadiene-styrene copolymer having impact resistivity were homogeneously mixed 1 part of an antistatic agent of dimethyltetrapolyoxyethyleneglycoldisilane (synthesized from dimethyltetraethoxydisilane and polyethyleneglycol and being one of the nonionic surfactants) and 1.5 parts of a promotor of Mordenite which was calcined and dehydrated at a temperature of 400° C., said mordenite being one form of natural zeolite. After pellets were prepared in the similar manner as in Example 1, they were molded by the injection method at a temperature of 22° C. to obtain molded discs having a diameter of 90 mm. and a thickness of 2 mm. The molded body obtained was not substantially discolored in its external appearance and was lustrous, and no degradation of the quality of the molded body by heating was observed.

With the rubbing test made on the molded body in the same manner as in Example 2, the electrostatic potential of the body was 10 v. without washing and 30 v. when washed, respectively.

Example 6

To 100 parts of the powder of polystyrene resin used in Example 1 were homogeneously mixed 2 parts of laurylpyridilium chloride serving as an antistatic agent of cationic surfactant type, and 1 part of bausite as a promotor which was calcined and dehydrated at a temperature of 400° C. Pellets were then prepared in the similar manner as in Example 1. The pellets were molded by injection method to obtain molded discs having a diameter of 90 mm. and a thickness of 2 mm. The molded body obtained did not become substantially discolored in its external appearance, and no degradation of the quality thereof by heating was observed.

When the rubbing test was effected on the molded body in the manner as in Example 2, the electrostatic potential of the body was zero volts without washing and 30 v. after washing, respectively.

The similar test further made on a molded body of the same composition and parts set forth above, except to which 1 part of colloidal silica or colloidal alumina had been further added indicated the electrostatic potential to be zero volts either before or after the washing treatment. Thus, the inclusion of colloidal silica or colloidal alumina improves the effects of the promotor.

Example 7

In 5 parts of a solution of polyoxyethyleneglycolmethylphenylether in purified ethylalcohol with a concentration of 40%, serving as an antistatic agent of nonionic surfactant type, were mixedly introduced 1 part of Analcite of natural zeolite, which was calcined at a temperature of 400° C. to be dehydrated, and 1 part of synthetic zeolite (Molecular Sieves 13X). The alcohol was then evaporated by heating to permit a mixture in powder form to be prepared. All the amount of the powder was homogeneously mixed with 100 parts of the powder of polymethylmethacrylate and pelletized at a temperature of 200° C. After the pellets obtained were dried at 80° C. for 20 hours to sufficiently remove moisture from the pellets, they were molded by injection method at a temperature of 215° C. and under a pressure of 85 kg./cm.$^2$ to obtain a disc plate having a diameter of 90 mm. and a thickness of 2.3 mm.

The molded plate was left for 24 hours in a room maintained at a temperature of 25° C. and a relative humidity of 50%, and thereafter rubbed for 20 times with a gauze applied with a load of 1 kg. The electrostatic potential on the surface of the molded plate was zero volts when measured immediately after the rubbing treatment. The similar rubbing treatment made after sufficiently washing with a synthetic detergent and maintaining it for 100 hours within a room maintained at the temperature and the relative humidity as above mentioned resulted in an electrostatic potential of also zero volts.

For the purpose of comparison, the electrostatic potential of a molded disc plate prepared in the same manner as above with the exception that natural zeolite was not used was 110 v. before washing and 3300 v. after washing, and the recovery of static charge preventing ability after washing was not observed.

Although the molded plate prepared in accordance with the method of this invention is somewhat opaque and lactescent, it is comparable with acrylic resin which may be rendered lactescent by the addition of a pigment such as titan white, and hence has no defects in its applicability.

Example 8

Ten grams of trimethylodecylammonium chloride serving as an antistatic agent of cationic surfactant type and 5 g. of synthetic zeolite (Molecular Sieves 10X, the trade name of the product marketed by Union Carbide and Chemical Corporation, U.S.A.) were homogeneously added to 1 kg. of polyethylene (density 0.96) obtained from a low pressure polymerization process and were pelletized.

The pellets thus prepared were calendered at a temperature between 165 and 175° C. after being dried at 50° C. for 18 hours in order to obtain a somewhat white opaque film of a thickness of 0.2 mm. When the rubbing test was carried out on the film in accordance with Example 7, the electrostatic potential of the film was zero volts both before and after washing. However, in a similar film containing no synthetic zeolite, the potential thereof was zero before washing, but 2800 v. after 100 hours and 2450 v. after 500 hours, respectively from the time of washing.

Example 9

Twenty-five kilograms of a copolymer of vinyl chloride and vinyl acetate as used in Example 2, 0.05 kg. of a lubricant of stearic acid, 0.04 kg. of a red dyestuff of Celliton type, 0.7 kg. of octadecyltrimethylammonium chloride as the antistatic agent of cationic type and 0.7 kg. of a promotor of synthetic zeolite (Molecular Sieves XW, the trade name adopted by Union Carbide and Chemical Corporation, U.S.A.) were homogeneously mixed together and formed into tablets at a temperature of from 40 to 45° C. and under a pressure of 70 kg./cm.$^2$ by means of a tabletting machine, said tablet each having a diameter of 250 mm. and a thickness of 25 mm. One of the tablets was heated at a temperature of 150° C. for three minutes by means of high frequency induction, and it was molded at a temperature of 150° C. and under a stamping pressure of 10 kg./cm.$^2$ by a press-molding machine for phonograph records to produce a somewhat opaque and red phonograph disc of 30 cm. in diameter.

The rubbing test was carried out on this recording disc according to the procedure of Example 7. The electrostatic potential was −20 v. before washing and −120 v. after 24 hours lapsed from the washing. For the purpose of comparison, a disc produced as above stated, but without using synthetic zeolite had an electrostatic potential of −70 v. before washing, but still had an electrostatic potential of −4500 v. after 10 days lapsed from the washing.

It will be understood that various changes may be made without departing from the spirit or scope of the invention herein disclosed, and it is intended in the appended claims to cover all such changes that fall within the true spirit and scope of the invention.

What is claimed is:

1. In the manufacture of a molded article made from a synthetic resin to which is added an antistatic agent to reduce electrostatic charging, an improved method comprising mixedly adding to said synthetic resin from 0.1 to 4.0% of a zeolitic substance selected from the group consisting of synthetic zeolite, natural zeolite and a mixture of them, and colloidal silica in an amount equal to that of the zeolitic substance together with from 0.1 to 4.0% of an antistatic agent selected from the group consisting of cationic surfactant, anionic surfactant and nonionic surfactant, said zeolitic substance and said colloidal silica acting jointly as promotors for said antistatic agent to further improve the reduction of electrostatic charging, all percentages mentioned above being by weight on the basis of the weight of the synthetic resin used.

2. In the manufacture of a molded article made from a synthetic resin to which is added an antistatic agent to reduce electrostatic charging, an improved method comprising mixedly adding to said synthetic resin from 0.1 to 4.0% of a zeolitic substance selected from the group consisting of synthetic zeolite, natural zeolite and a mixture of them, and collodial alumina in the amount equal to that of the zeolitic substance together with from 0.1 to 4.0% of an antistatic agent selected from the group consisting of cationic surfactant, anionic surfactant and nonionic surfactant, said zeolitic substance and said colloidal alumina acting jointly as promotors for said antistatic agent to further improve the reduction of electrostatic charging, all percentages mentioned above being by weight on the basis of the weight of the synthetic resin used.

References Cited

UNITED STATES PATENTS 2,879,244  3/1959  Coler _____ 260—41
3,036,980  5/1962  Dunham et al. _____260

MORRIS LIEBMAN, *Primary Examiner.*

SAMUEL L. FOX, *Assistant Examiner.*

U.S. Cl. X.R.

260—41.5